T. G. PERKINS.
BATTER FEEDING DEVICE.
APPLICATION FILED NOV. 16, 1912.
1,124,943.
Patented Jan. 12, 1915.
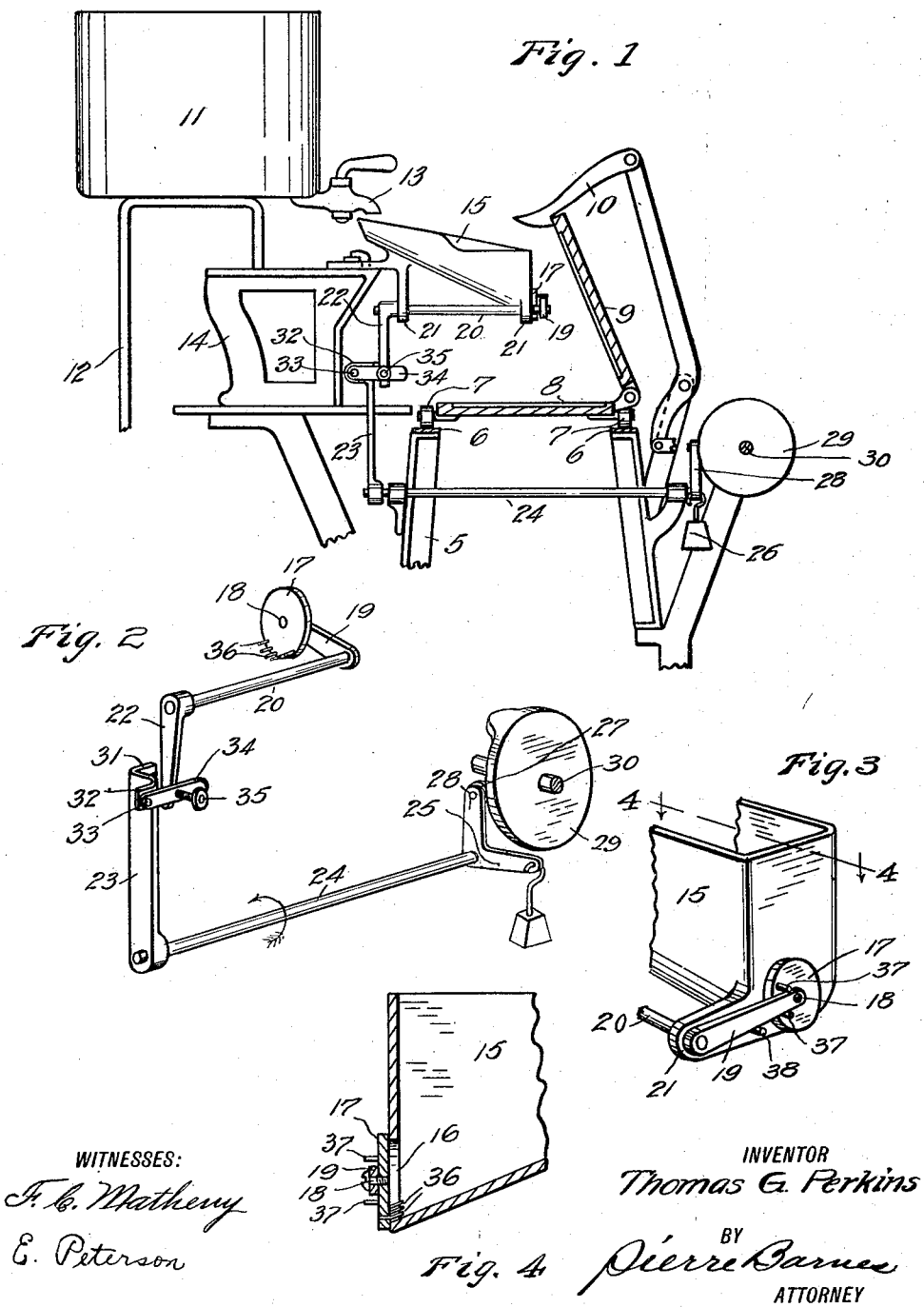
WITNESSES:
F. C. Matheny
E. Peterson
INVENTOR
Thomas G. Perkins
BY
Pierre Barnes
ATTORNEY

UNITED STATES PATENT OFFICE.

THOMAS G. PERKINS, OF SEATTLE, WASHINGTON, ASSIGNOR TO EARL C. MEIER AND GEORGE A. NELSON, BOTH OF SEATTLE, WASHINGTON.

BATTER-FEEDING DEVICE.

1,124,943.  Specification of Letters Patent.  Patented Jan. 12, 1915.

Application filed November 16, 1912. Serial No. 731,685.

*To all whom it may concern:*

Be it known that I, THOMAS G. PERKINS, a citizen of the United States, residing at Seattle, in the county of King and State of Washington, have invented certain new and useful Improvements in Batter-Feeding Devices, of which the following is a specification.

This invention relates to batter-feeding device for cake cooking machines of the class shown and described in United States Patent No. 1,039,183, issued to me September 24, 1912.

The object of my invention is the perfecting of such devices to render the same more regular and efficient in operation.

The invention is illustrated in the accompanying drawings, in which—

Figure 1 is a transverse sectional view of a portion of a cake cooking machine with the present invention applied thereto. Fig. 2 is a perspective view of the batter-feed valve and the mechanism for controlling the same. Fig. 3 is a fragmentary perspective view of the batter-feeding trough and the valve therefor. Fig. 4 is a vertical section taken through 4—4 of Fig. 3.

The reference numeral 5 designates the frame of a cake baking machine provided with track rails, such as 6, for the wheels 7 of the baking irons 8 which constitute elements of an intermittently driven chain. Hingedly connected to the rear edge of each of said irons is a supplementary iron 9 which, upon being brought into proximity of the batter feeding position, is swung upwardly by means of a hooked arm 10 and is subsequently held in such elevated position while the batter is fed to an iron 8 with the latter motionless, all as fully explained in the above mentioned patent.

At the front of the machine is a batter tank 11 supported by suitable frame work 12 at a distance above the top of the referred to machine frame and is provided with a discharge spigot 13.

Detachably connected to a support, as 14, is an inclined trough or batter-receptacle 15 disposed to receive batter at its upper end from the spigot 13, while its lower end projects over a baking iron 8. At the lower end of the trough is a discharge opening 16 which is closed by a disk-shaped gate 17 which is connected by an axially disposed pivotal pin 18 with a vibrating arm 19. This arm is carried by a rocker shaft 20 journaled in lugs, such as 21, provided on the trough and having at its other end a downwardly directed arm 22. The latter is operated by an arm 23 projecting upwardly from a shaft 24 which extends through the frame, as shown in Fig. 1, and has secured to shaft and the rear of the frame a bell-crank lever. One arm 25 of this lever is directed longitudinally of the frame and suspended by the arm is a weight 26 which acts to rotate shaft 24 to cause a roller 27 which is carried by the other lever arm 28 to be yieldingly held against a cam 29 which is mounted upon a power driven shaft 30 at the rear of the frame.

At its upper end the arm 23 is provided at its lateral edges, respectively, with readwardly and forwardly directed lugs 31 and 32 and secured to the latter by a pivot pin 33 is a plate 34 which in operation is extended rearwardly, as illustrated in Figs. 1 and 2. Threaded through a hole provided in plate 34 is a screw 35 which is disposed to have its extremity impinge against the arm 22 when the arm 23 is swung in the direction indicated by the arrow to correspondingly swing the arm 22 to effect the opening of the gate 17, but when the arm 23 is, through the office of weight 26, swung in a contrary direction, the gate is rapidly closed and may be maintained in such position by withdrawing the plate 34 from its position wherein it will present the screw 35 for engagement by the arm 22.

Protruding inwardly from near the bottom of the gate 17 and into the trough 15 is a plurality of comb-like teeth 36 whose function is to break any solidification which may be produced through a cooking effect upon the batter due to the heat to which the trough is subjected. To which end, protruding studs 37 are provided upon the outside of the gate which are spaced at greater distances apart than the width of the gate-carrying arm 19 and are respectively located above and below the latter. When the arm 17 is swung upwardly the gate is lifted and rotated resulting in a side swing of the teeth 36 as they ascend until the rotation of the gate is interrupted by the uppermost of the studs 37 encountering the arm 19. When the arm 19 is swung downwardly, the lower stud is engaged thereby to swing the teeth oppositely as they descend with the closing of the gate.

38 represents a stop to limit the downward swing of the arm 19 when the gate 17 is brought into close position, while the upward swing of arm 19 is adjusted by regulating the screw 35 to afford more or less lost motion to the actuating arm 23 with respect to the arm 22 which is positively connected with the gate-carrying arm 19.

The cam 29 is adapted to open the gate for the delivery of batter upon an iron 8 when the same is motionless and the quantity of batter thus delivered is regulated by the amount of opening of such valve. When it is desired to prevent any batter being discharged, the plate 34 is withdrawn from operative position.

What I claim, is—

1. In a baking machine, the combination of a batter-feeding appliance comprising a receptacle having a discharge opening, a gate therefor, a device provided on the gate and extending through said discharge opening into said receptacle for agitating the batter in proximity thereto, a rocker shaft, an arm carried by the shaft and connected at its free end with the gate, means for imparting an oscillatory motion to said shaft, and devices included in the last named means whereby such means may be rendered temporarily inoperative to actuate the gate.

2. In a baking machine, the combination of batter-feeding appliances, comprising a receptacle having a discharge opening, a gate therefor, a device provided on the gate and extending through said discharge opening into said receptacle for agitating the batter in proximity thereto, a rocker-shaft, an arm carried by the shaft and connected at its free end with the gate to permit a rotary movement of the latter, means coöperating with said arm for producing limited rotary movements of the gate, and effecting reciprocatory lateral movements of said device during the opening and closing movements of the gate, and means for imparting an oscillatory motion to said shaft.

3. In a baking machine, a batter receptacle having a discharge opening, a gate for said opening, devices extending from the gate through said opening into the receptacle, means for effecting periodic movements of the gate for opening and closing said opening and also serving to cause said devices to become operative for breaking any solidifications of the batter tending to form within the receptacle in proximity to the opening thereof.

Signed at Seattle, Wash., this 26th day of October, 1912.

THOMAS G. PERKINS.

Witnesses:
PIERRE BARNES,
HORACE BARNES.

Copies of this patent may be obtained for five cents each, by addressing the "Commissioner of Patents, Washington, D. C."